United States Patent
Cleveland

(10) Patent No.: US 8,520,606 B2
(45) Date of Patent: *Aug. 27, 2013

(54) SYNCHRONOUS SPECTRUM SHARING BASED ON OFDM/OFDMA SIGNALING

(75) Inventor: Joseph R. Cleveland, Murphy, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 1746 days.

This patent is subject to a terminal disclaimer.

(21) Appl. No.: 11/585,009

(22) Filed: Oct. 23, 2006

(65) Prior Publication Data

US 2008/0095135 A1 Apr. 24, 2008

(51) Int. Cl.
| | |
|---|---|
| H04W 4/00 | (2009.01) |
| H04W 40/00 | (2009.01) |
| H04W 72/00 | (2009.01) |
| H04J 3/00 | (2006.01) |
| H04B 7/212 | (2006.01) |
| H04B 7/208 | (2006.01) |

(52) U.S. Cl.
USPC ........... 370/329; 370/337; 370/341; 370/344; 455/448; 455/450; 455/452.1; 455/454

(58) Field of Classification Search
USPC ................. 370/329, 337, 341, 344; 455/448, 455/450, 452.1, 454
See application file for complete search history.

(56) References Cited

U.S. PATENT DOCUMENTS

| | | | | |
|---|---|---|---|---|
| 5,396,496 | A * | 3/1995 | Ito et al. | 370/314 |
| 6,101,176 | A * | 8/2000 | Honkasalo et al. | 370/335 |
| 7,277,412 | B2 * | 10/2007 | Sugaya et al. | 370/337 |
| 2004/0233888 | A1 * | 11/2004 | Bonta et al. | 370/350 |
| 2005/0063298 | A1 * | 3/2005 | Ling et al. | 370/208 |
| 2005/0128977 | A1 * | 6/2005 | Kwak et al. | 370/329 |
| 2007/0070208 | A1 * | 3/2007 | Yahagi | 348/207.99 |
| 2008/0095100 | A1 * | 4/2008 | Cleveland et al. | 370/328 |
| 2008/0112308 | A1 * | 5/2008 | Cleveland | 370/204 |
| 2008/0112359 | A1 * | 5/2008 | Cleveland et al. | 370/329 |
| 2008/0232487 | A1 * | 9/2008 | Cleveland et al. | 375/260 |

* cited by examiner

Primary Examiner — Vladimir Magloire
Assistant Examiner — Edd Rianne Plata

(57) ABSTRACT

A system and method for synchronous spectrum sharing for use in a wireless communication system based on orthogonal frequency-division multiplexing (OFDM) or orthogonal frequency division multiple access (OFDMA) signaling is disclosed. The system includes a frame detector configured to detect a frame of a broadcast waveform and extract idle spectrum information for the frame to the secondary user node. The system allows transmitting data from the secondary user node in unused symbol slots identified in the idle spectrum information thereby making efficient use of unused or idle spectrum. Accordingly, secondary users of the wireless communication system can dynamically form ad-hoc mesh network communications in fixed or mobile scenarios.

21 Claims, 9 Drawing Sheets

SYNCHRONOUS SPECTRUM SHARING BASED ON OFDM/OFDMA SIGNALING

TECHNICAL FIELD OF THE INVENTION

The present disclosure relates generally to communication networks and, in particular, to systems for synchronous spectrum sharing.

BACKGROUND OF THE INVENTION

Conventional fixed spectrum allocation schemes lead to significant spectrum under-utilization. For instance, experiments have indicated that as much as 62% of the spectrum below the 3 GHz band is idle even in the most crowed areas (e.g., near downtown Washington D.C. where both government and commercial spectrum usage is intensive). Such under-utilization and increasing demand for the radio spectrum suggest that a more effective spectrum allocation and utilization policy is necessary.

Currently, secondary users may use the licensed spectrum only when such use does not interfere with a primary user's communication. Such requirements imply that the use of the spectrum varies with time (i.e., dynamically changes), and is dependent on the load imposed by the primary users. Several conventional systems use multiple channels in wireless networks. However, such systems fail in dynamic spectrum access networks. For example, conventional systems assume that the set of available channels is static (i.e., the channels available for use are fixed at the time of network initiation). In multiple access wireless networks, however, such as Worldwide Interoperability for Microwave Access (WiMAX) with orthogonal frequency division multiple access (OFDMA) signaling, the set of available channels dynamically changes. Furthermore, conventional systems often assume that the available channels are "homogeneous" (i.e., different channels have similar range and support similar data rates). These assumptions do not hold true in situations such as, for example, where different channels are located on widely separated slices of frequency spectrum with different modulation schemes and different propagation characteristics.

Therefore, there is a need for synchronous spectrum sharing systems based on orthogonal frequency-division multiplexing (OFDM) or OFDMA signaling.

SUMMARY OF THE INVENTION

The present disclosure provides a technique for synchronous spectrum sharing based on orthogonal frequency-division multiplexing (OFDM) or orthogonal frequency division multiple access (OFDMA) signaling.

In one embodiment, a synchronous spectrum sharing system for using in a wireless communication system is provided. The wireless communication system includes a primary user node and a secondary user node. The system includes a frame detector configured to detect a frame of a broadcast waveform and extract idle spectrum information for the frame to the secondary user node. The secondary user node transmits data in a first unused symbol slot identified in the idle spectrum information.

In another-embodiment, a method of synchronous spectrum sharing for use in a wireless communication network having a primary user node and a secondary user node is provided. The method includes detecting a frame of a broadcast waveform. The method also includes extracting idle spectrum information for the frame to the secondary user node. The method further includes transmitting data from the secondary user node in a first unused symbol slot identified in the idle spectrum information.

In still another embodiment, an apparatus for synchronous spectrum sharing for use in an OFDM/OFDMA wireless communication system is provided. The apparatus includes a secondary user node having a node modem; and a frame detector configured to detect a frame of a broadcast waveform and extract idle spectrum information for the frame to the secondary user node. The secondary user node transmits data in a first unused symbol slot identified in the idle spectrum information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
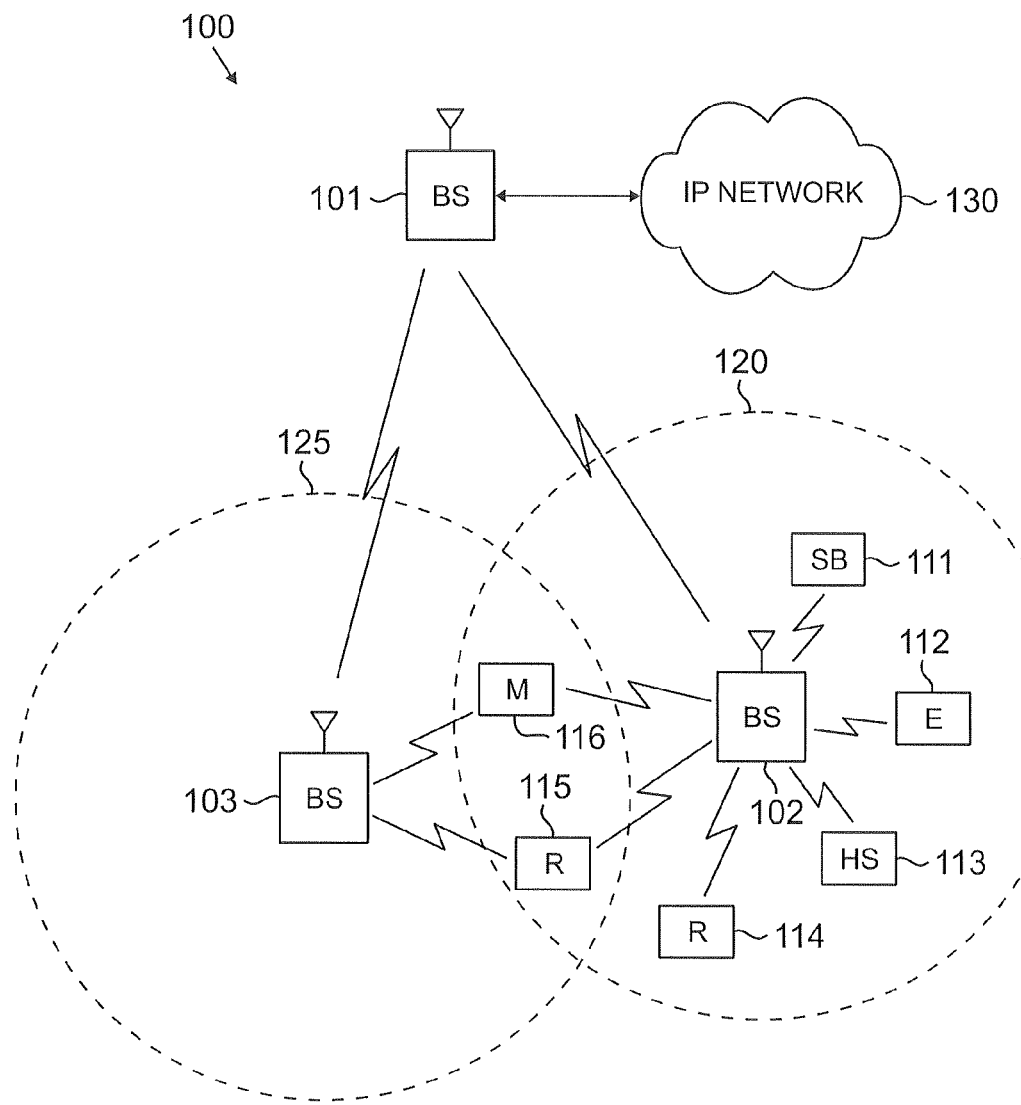
FIG. 1 is an exemplary wireless network suitable for synchronous spectrum sharing according to one embodiment of the present disclosure.

FIG. 1 illustrates an exemplary wireless network 100 suitable for synchronous spectrum sharing according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
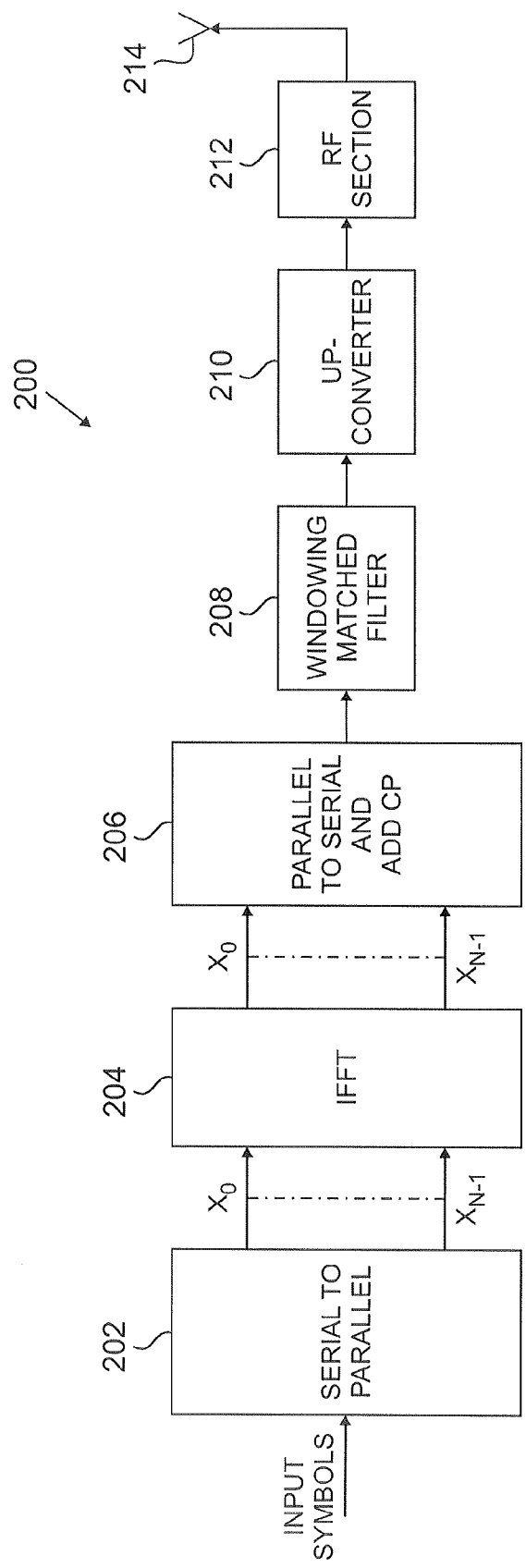
FIG. 2 is an exemplary block diagram of an orthogonal frequency-division multiplexing (OFDM) transmitter according to one embodiment of the present disclosure.

FIG. 2 is exemplary block diagram of a typical OFDM/OFDMA transmitter 200 according to one embodiment of the present disclosure. Transmitter 200 constructs, for example, an OFDM/OFDMA composite signal by first passing the serial output of a formatted, encoded, interleaved data signal through serial-to-parallel converter 202. Serial-to-parallel converter 202 separates each data signal into parallel data streams (e.g., $X_0 \ldots X_{N-1}$). A mapping function (MAP) within serial-to-parallel converter 202 maps each parallel data stream into I and Q modulation symbols, which are then applied to inverse fast Fourier transform (IFFT) block 204. The subcarrier separation is preferably an inverse of the symbol rate. IFFT block 204 computes the IFFT of each data stream and passes the output to parallel-to-serial and cyclic prefix (CP) block 206.

Parallel-to-serial and CP block 206 combines each parallel data stream into a data signal and introduces CP to aid in eliminating inter-symbol interference (ISI) and inter-block interference as later described in detail herein. Parallel-to-serial and CP block 206 sums the multiple subcarriers to the transmission frequency. For operation in time division duplex (TDD) mode, Parallel-to-serial and CP block 206 inserts a guard interval (GI) into the signal. The output of parallel-to-serial and CP block 206 is passed to windowing matched filter 208 and then to up-converter block 210. The output of up-converter block 210 is then passed to RF section block 212 and transmitted via antenna 214. Accordingly, in the example shown in FIG. 2, user data signals may be represented by a set of 2N subcarriers. In addition, pilot plus control signaling may be represented by a set of 2M separate subcarriers.

Figure 3:
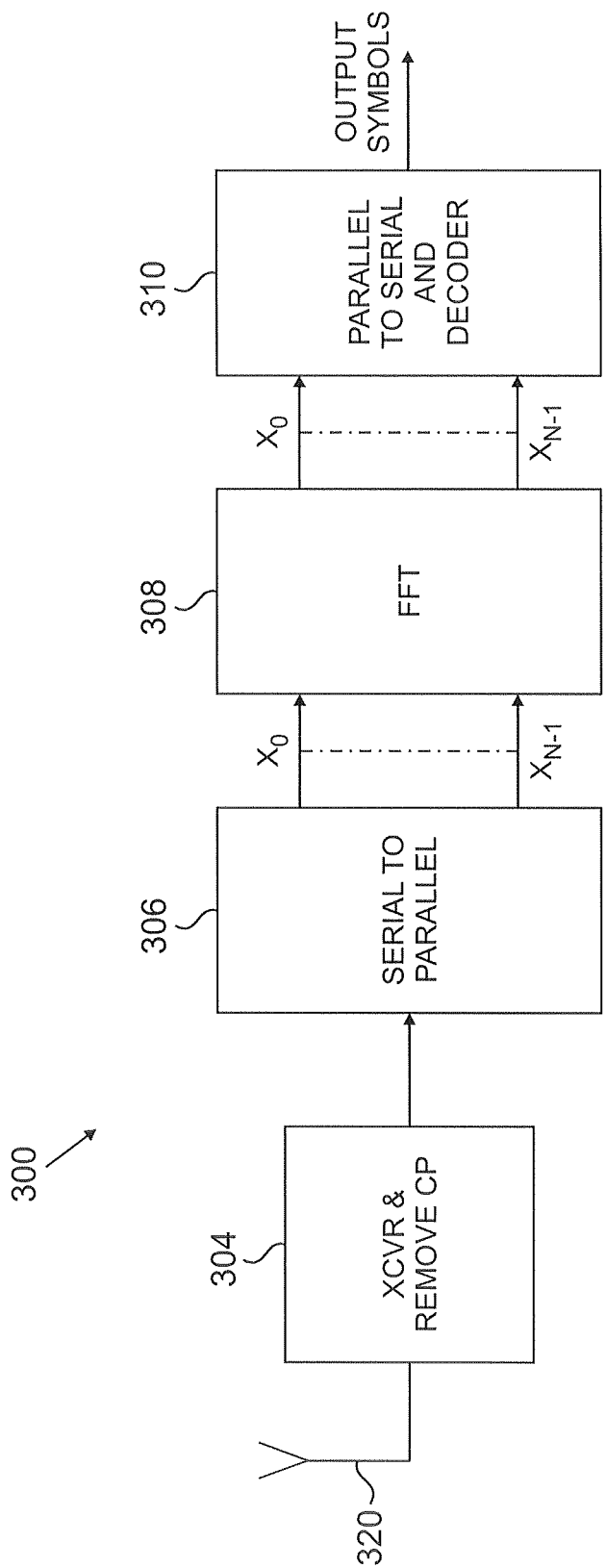
FIG. 3 is an exemplary block diagram of an OFDM receiver according to one embodiment of the present disclosure

FIG. 3 is an exemplary block diagram of a typical OFDM/OFDMA receiver 300 according to one embodiment of the present disclosure. Receiver 300 detects the transmitted symbols and essentially reverses the process implemented by transmitter 200 described above. For example, the signal transmitted by antenna 214 is received by antenna 302. The signal is passed to transceiver and CP remove block 304. Transceiver and CP remove block 304 removes the CP from the signal and passes the signal to serial-to-parallel block 306. Serial-to-parallel block 306 separates the data signal into parallel data streams (e.g., $X_0 \ldots X_{N-1}$). A MAP within serial-to-parallel converter 201 maps each parallel data stream into I and Q modulation symbols, which are then passed to fast Fourier transform (FFT) block 308. The output of FFT block 308 is then passed to parallel-to-serial and decoder block 310 and then output as desired.

Figure 4:
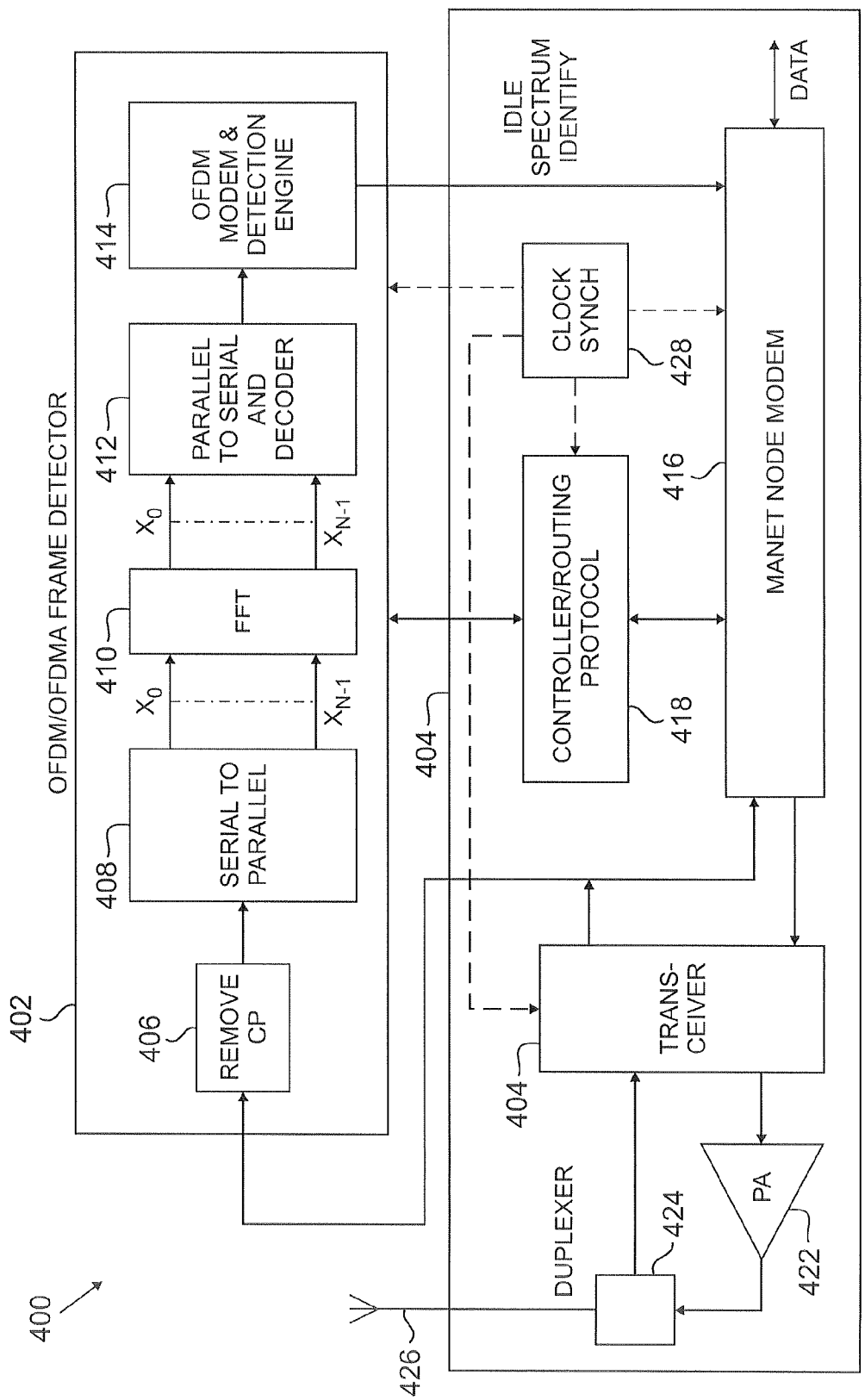
FIG. 4 is an exemplary block diagram illustrating the use of an OFDM or orthogonal frequency division multiple access (OFDMA) spectrum by a secondary spectrum user according to one embodiment of the present disclosure.

FIG. 4 is an exemplary block diagram of system 400 having an OFDM/OFDMA frame detector 402 and a transceiver module 404 in accordance with one embodiment of the present disclosure. OFDM/OFDMA frame detector 402 detects signals received from transceiver module 404. The signal is passed to CP remove block 406. CP remove block 406 removes the CP from the signal and passes the signal to serial-to-parallel block 408. Serial-to-parallel block 408 separates the data signal into parallel data streams (e.g., $X_0 \ldots X_{N-1}$). A MAP within serial-to-parallel converter 408 maps each parallel data stream into I and Q modulation symbols, which are then applied to FFT block 410. The output of FFT block 410 is passed to parallel-to-serial and decoder block 412 and then output to OFDM/OFDMA modem and detection engine 414.

OFDM/OFDMA frame detector 402 detects the broadcast OFDM waveform, synchronizes the waveform to the OFDM frame and extracts the down-link and up-link channel assignments for that frame with OFDM modem and detection engine 414. Accordingly, OFDM/OFDMA frame detector 402 forwards idle spectrum information to node modem 416. Node modem 416 may be any suitable modem including, for example, a mobile ad hoc networking (MANET) node modem, in accordance with one embodiment of the present disclosure. For operation as an interactive node in either a fixed or mobile ad hoc network, transceiver module 404 may include, for example, controller and ad-hoc routing protocol module 418, transceiver 420, power amplifier 422, duplexer 424, antenna 426, and clock and synchronizer module 428.

Accordingly, system 400 identifies available or idle spectrum information and provides secondary users access to the idle spectrum in, for example, IEEE-802.16 or WiMAX signals. More specifically, secondary users have dynamic access to channel availability (e.g., "white space") in broadcast wireless waveforms such as, for example, in IEEE-802.16 or WiMAX, on a non-interfering or leasing basis as later described in detail in conjunction with the description accompanying FIGS. 6 and 7A.

Figure 5:
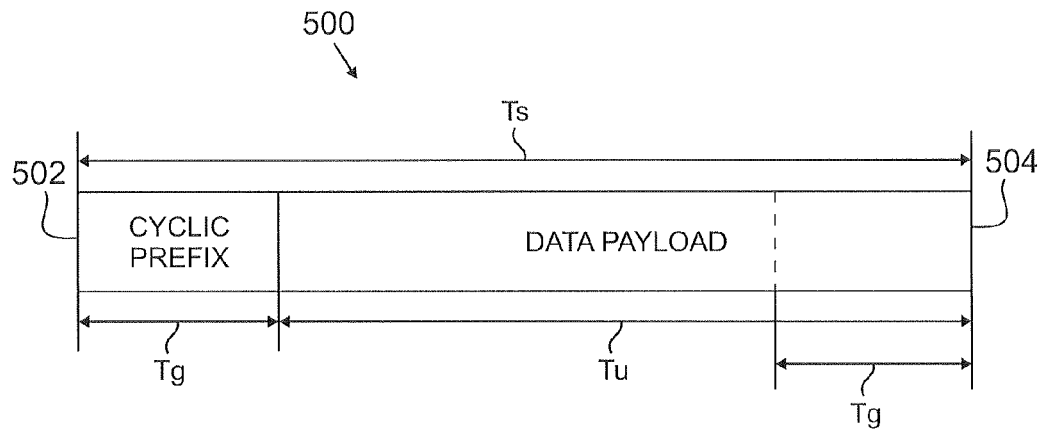
FIG. 5 depicts the insertion of a cyclic prefix (CP) to a data payload according to one embodiment of the present disclosure.

FIG. 5 illustrates OFDM symbol 500 in which CP 502 is inserted into data payload 504 according to one embodiment of the present disclosure where the total symbol period ($T_s$) is greater than the sum of the guard times ($T_g$) and the useful symbol period ($T_u$). OFDM waveforms provide increased symbol duration (i.e., $T_s$ and $T_u$) and thus improves the robustness of OFDM to delay spread. Accordingly, with the introduction of CP 502, system 400 can completely eliminate ISI as long as the duration of CP 502 is longer than the channel delay spread. CP 502 is typically a repetition of the last samples of data portion of the block that is appended to the beginning of data payload 504 as shown in FIG. 5. CP 502 prevents inter-block interference and makes the channel appear circular. CP 502 therefore permits low-complexity frequency domain equalization. While CP 502 somewhat reduces bandwidth efficiency, the impact of CP 502 is similar to the "roll-off factor" in raised-cosine filtered single-carrier systems. Notably, OFDM has a very sharp, almost "brick-wall" spectrum. Thus, a large fraction of the allocated channel bandwidth may be utilized for data transmission and for moderating the loss in efficiency due to CP 502.

Similar attributes exist for OFDMA. The OFDMA symbol structure consists of three types of sub-carriers: (1) Data sub-carriers for data transmission; (2) Pilot sub-carriers for estimation and synchronization purposes; and (3) Null sub-carriers for no transmission (typically used for guard bands and DC carriers). Active sub-carriers (i.e., data and pilot sub-carriers) are grouped into subsets of sub-carriers called subchannels.

In certain standards such as, for example, IEEE-802.16-2004 and IEEE-802.16-2005, the minimum frequency-time resource unit of sub-channelization is one slot. One slot is typically equal to 48 data tones or sub-carriers. The two types of sub-carrier permutations for sub-channelization are the diversity permutation and the contiguous permutation.

The diversity permutation draws sub-carriers pseudo-randomly to form a sub-channel and provides frequency diversity and inter-cell interference averaging. The diversity permutations include downlink (DL) FUSC (Fully Used Sub-Carrier), DL PUSC (Partially Used Sub-Carrier) and uplink (UL) PUSC and additional optional permutations. With DL PUSC, for each pair of OFDM symbols, the available or usable sub-carriers are grouped into clusters containing 14 contiguous sub-carriers per symbol, with pilot and data allocations in each cluster in the even and odd symbols.

A re-arranging scheme is used to form groups of clusters such that each group is made up of clusters that are distributed throughout the sub-carrier space. A sub-channel in a group contains two (2) clusters and is comprised of 48 data sub-carriers and eight (8) pilot subcarriers. Analogous to the cluster structure for DL, a tile structure is defined for the UL PUSC. The available sub-carrier space is split into tiles and six (6) tiles, chosen from across the entire spectrum by means of a re-arranging/permutation scheme, are grouped together to form a slot. The slot is comprised of 48 data sub-carriers and 24 pilot sub-carriers in three (3) OFDM symbols.

The contiguous permutation, on the other hand, groups a block of contiguous sub-carriers to form a subchannel. The contiguous permutations include DL advanced modulation and coding (AMC) and UL AMC, and have the same structure. A bin consists of nine (9) contiguous sub-carriers in a symbol, with eight (8) assigned for data and one assigned for a pilot. A slot in AMC is defined as a collection of bins of the type (N×M=6), where N is the number of contiguous bins and M is the number of contiguous symbols. Thus the allowed combinations are [(6 bins, 1 symbol), (3 bins, 2 symbols), (2 bins, 3 symbols), (1 bin, 6 symbols)]. AMC permutation enables multi-user diversity by choosing the sub-channel with the best frequency response.

The IEEE-802.16-2005 Wireless MAN OFDMA mode is based on the concept of scalable OFDMA (S-OFDMA). S-OFDMA supports a wide range of bandwidths to flexibly address the need for various spectrum allocation and usage model requirements. The scalability of the OFDMA system is accomplished by adjusting the FFT size while fixing the sub-carrier frequency spacing at 10.94 kHz. Since the resource unit sub-carrier bandwidth and symbol duration is fixed, the impact to higher layers is minimal when scaling the bandwidth. A set of embodiments for S-OFDMA parameters are listed in TABLE 1 below.

TABLE 1

SCALABLE OFDMA PARAMETERS OF WIMAX

| Parameters | Values | | | |
|---|---|---|---|---|
| System Channel Bandwidth (MHz) | 1.25 | 5 | 10 | 20 |
| Sampling Frequency ($F_p$ in MHz) | 1.4 | 5.6 | 11.2 | 22.4 |
| FFT Size ($N_{FFT}$) | 128 | 512 | 1024 | 2048 |
| Number of Sub-Channels | 2 | 8 | 16 | 32 |
| Sub-Carrier Frequency Spacing | 10.94 kHz | | | |
| Useful Symbol Time ($T_b = 1/f$) | 91.4 microseconds | | | |
| Guard Time ($T_g = T_b/8$) | 11.4 microseconds | | | |
| OFDMA Symbol Duration ($T_s = T_b + T_g$) | 102.9 microseconds | | | |
| Number of OFDMA Symbols (5 ms Frame) | 48 | | | |

Figure 6:
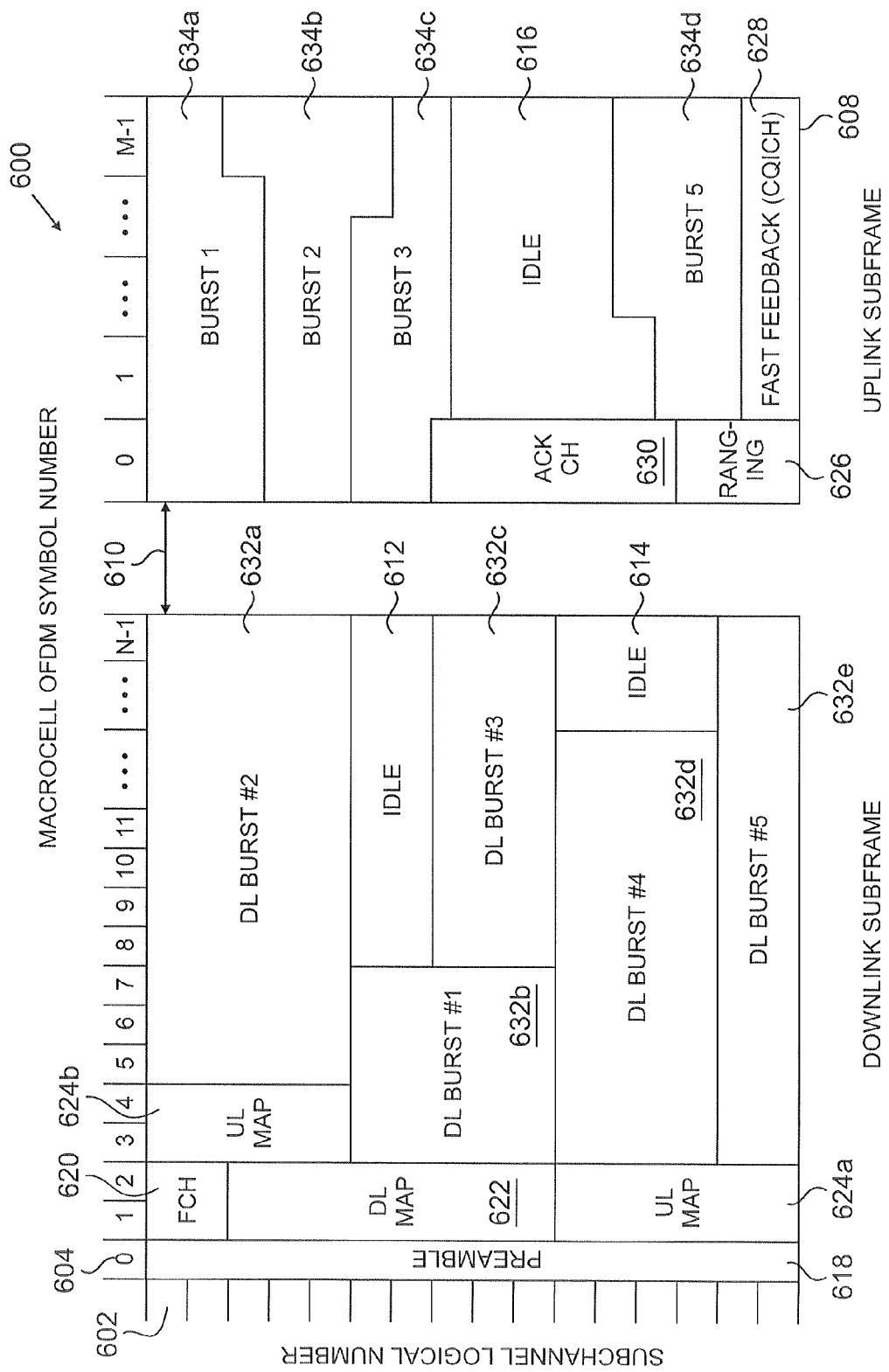
FIG. 6 is an OFDMA frame structure for a time division duplex (TDD) implementation according to one embodiment of the present disclosure.

FIG. 6 illustrates a WiMAX OFDM/OFDMA broadcast frame 600 for TDD implementation according to one embodiment of the present disclosure. Broadcast frame 600 illustrates the relationship between a given subchannel logical number 602 and a macrocell OFDM/OFDMA time slot or symbol number 604. Broadcast frame 600 is further divided into and supports subchannelization in DL subframe 606 and UL subframe 608. DL sub-frame 606 and UL subframe 608 are separated by transmit/receive transition gaps (TTG) and receive/transmit transition gaps (RTG) (collectively referred to herein as transition gap 610). Transition gap 610 prevents DL and UL transmission collisions. DL subframe 606 and UL subframe 608 include several unused or idle spectrum such as, for example, idle blocks 612, 614 and 616. Although a specified number of idle blocks is illustrated in DL subframe 606 and UL subframe 608, it should be understood that any number of idle blocks in fact be available in accordance with the present disclosure.

Control information for broadcast frame 600 is used to ensure optimal system operation. For example, control information may include preamble 618, frame control head (FCH) 620, DL-MAP 622, UL-MAPs 624a and 624b (collectively referred to herein as UL-MAP 624), UL ranging subchannel 626, UL channel quality indicator channel (CQICH) 628 and UL acknowledge subchannel (ACK) 630. Preamble 618 is used for synchronization is the first symbol number 604 of broadcast frame 600. FCH 620 follows preamble 618 and provides frame configuration information such as MAP message length, coding scheme and usable sub-channels.

DL-MAP 622 and UL-MAP 624 provide sub-channel allocation and other control information for DL subframe 606 and UL subframe 608, respectively. UL ranging subchannel 626 is allocated for mobile stations (MS) to perform closed-loop time, frequency, and power adjustment as well as bandwidth requests. UL CQICH 628 is allocated for the MS to feedback channel state information, while UL ACK 630 is allocated for the MS to feedback DL (hybrid automatic request) HARQ acknowledgement.

Finally, DL subframe 606 is shown with several DL data bursts 632a, 632b, 632c, 632d and 632e (collectively referred to herein as DL data bursts 632). It should be understood that any suitable number of DL data bursts 632 may be included in DL subframe 606. Similarly, UL subframe 608 is shown with several UL data bursts 634a, 634b, 634c, 634d and 634e) (collectively referred to herein as UL data bursts 634). It should be understood that any suitable number of UL data bursts 634 may be included in DL subframe 606.

Figure 7B:
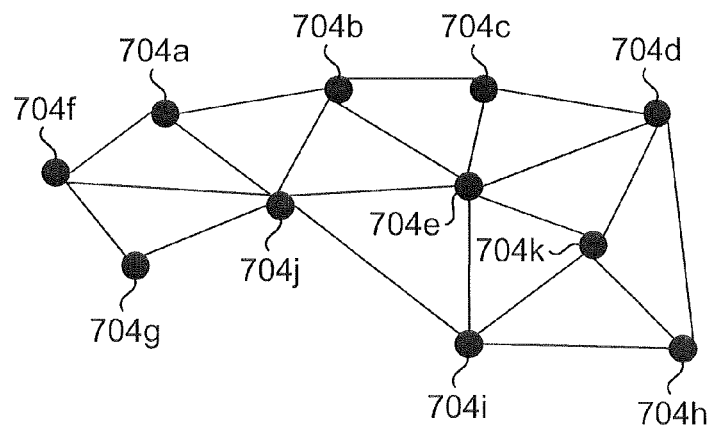
FIG. 7B is an exemplary cluster of secondary nodes according to one embodiment of the present disclosure.
Figure 7A:
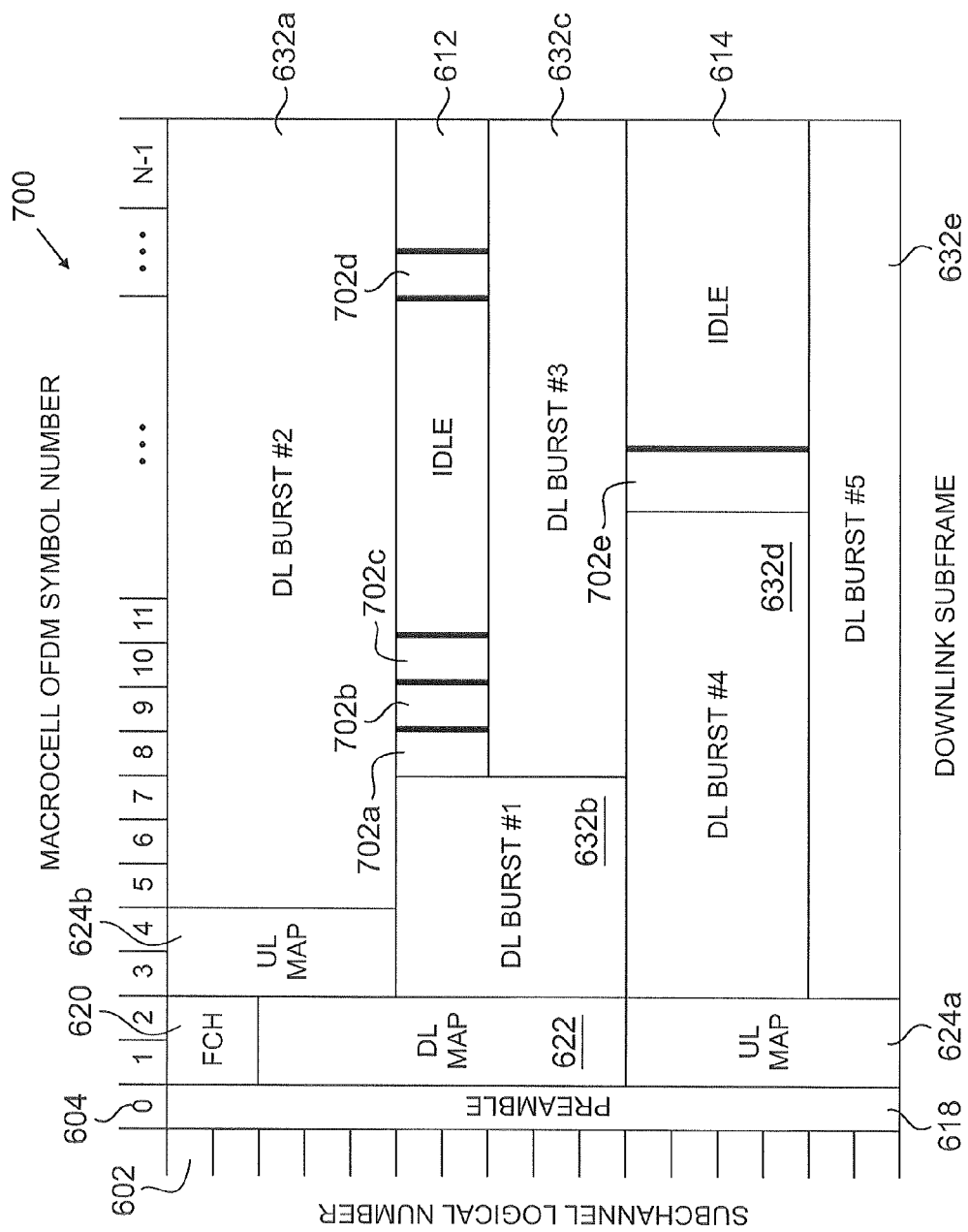
FIG. 7A is an OFDMA frame structure with secondary node packet bursts in unused OFDM symbol slots according to one embodiment of the present disclosure.

FIG. 7A is an expanded view of DL subframe 606 of broadcast frame 600 shown with secondary node data bursts 702a, 702b, 702c, 702d and 702e (collectively referred to herein as secondary node data bursts 702) according to one embodiment of the present disclosure. Secondary node data bursts 702 are in located in unused symbol numbers 604. For example, secondary node data burst 702a occurs in idle block 612 and specifically within the "8th" symbol number 604. Similarly, secondary node data burst 702b occurs in idle block 612 and specifically within the "9th" symbol number 604. Likewise, secondary node data burst 702c occurs in idle block 612 and specifically within the "10th" symbol number 604. Secondary node data burst 702d occurs in idle block 612 between the "11th" symbol number 604 and the "N-1" symbol number 604. As still another example, secondary node data burst 702e occurs in idle block 614 within some symbol number 604 between the "11th" symbol number 604 and the "N-1" symbol number 604.

FIG. 7B illustrates an example cluster of secondary nodes 704a-704k (collectively referred to herein as secondary node 704). As one example, secondary node 704a may have transmitted secondary node data burst 702a in idle block 612, while secondary node 704b may have transmitted secondary node data burst 702b in idle block 612. At the same time, secondary node 704c may have transmitted secondary node data burst 702c in idle block 612 and secondary node 704d may have transmitted secondary node data burst 702d in idle block 612. Similarly, secondary node 704e may have transmitted secondary node data burst 702e in idle block 614. It should be understood that any suitable number and combinations of secondary nodes 704 may transmit data into idle block 612 and 614 at the same time.

Each one of secondary user nodes 704 uses an OFDM/OFDMA frame detector 402 to synchronize to broadcast frame 600, and to detect, for example, preamble 618, DL-MAP 622 and UL-MAP 624. Although there are a specific number of secondary user nodes 704 and secondary shown in FIG. 7B, any suitable number of secondary user nodes 704 and secondary node data bursts 702 may be used in accordance with the present disclosure.

DL-MAP 622 and UL-MAP 624 provide sub-channel allocation and other control information for DL subframe 606 and UL subframe 608, respectively. Thereby, each one of secondary user nodes 704 can ascertain which set of subcarriers and symbol number 604 will be idle or unassigned during a given OFDM/OFDMA frame, such as broadcast frame 600. If one of secondary nodes 704 has no data to transmit, that secondary node 704 listens for data symbols transmitted by neighboring secondary nodes 704 on idle subcarriers during the idle symbol periods (e.g., idle blocks 612, 614 and 616). On the other hand, if one of secondary nodes 704 has data to transmit, that secondary node 704 transmits data transmitted to neighboring secondary nodes 704 on idle subcarriers during the idle symbol periods for the down-link as illustrated by FIG. 7A. Transmission by the ad hoc or secondary node 704 within up-link idle spectrum is similarly accomplished.

In one embodiment of the present disclosure, the secondary node 704 starts transmission after the passage of a guard time ($T_g$), such as in the ALOHA scheme. In another embodiment of the present disclosure, the transmitting node determines if another secondary node 704 is already transmitting in unassigned subcarriers in symbol number 604 by conventional carrier sense multiple access (CSMA) techniques. As shown in FIGS. 7A and 7B, two secondary nodes 704 may transmit simultaneously in the same symbol number 604 in different subcarriers. If unassigned subcarriers are found to be in use by other secondary nodes 704, other secondary nodes 704 waits for the next idle block (e.g., idle block 612, 614 or 616) and repeats the access process.

In one embodiment according to the present disclosure, the battery life for battery-powered secondary nodes 704 may be extended. For example, secondary nodes 704 can power-down the transmitter circuitry of there is no data to transmit. Furthermore, secondary nodes 704 can power-down the receiver circuitry and other non-essential circuits during symbol number 604 when there are no idle subcarriers. The secondary node powers up at the appropriate time to receive the OFDM frame, DL-MAP and UL-MAP.

Figure 8:
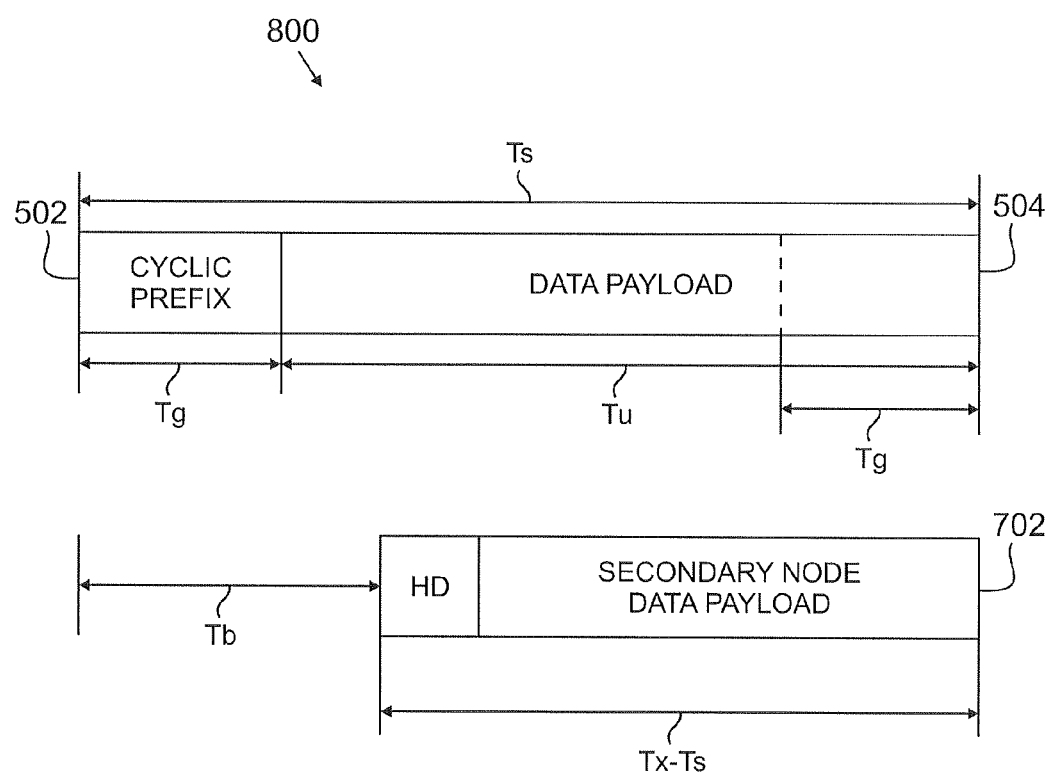
FIG. 8 depicts an exemplary secondary node data burst relative to an OFDMA frame structure for a given OFDM symbol period according to one embodiment of the present disclosure.

Referring now to FIG. 8, the symbol period or length ($T_x$) of secondary node data burst 702 is preferably kept less than or equal to in time duration as the OFDM symbol period ($T_s$) in the broadcast frame 600. Secondary node data burst 702 may use a variable length symbol format. However, a shorter symbol period ($T_x$) implies a greater subcarrier spacing if the secondary node modulation is based on OFDM as well.

Figure 9:
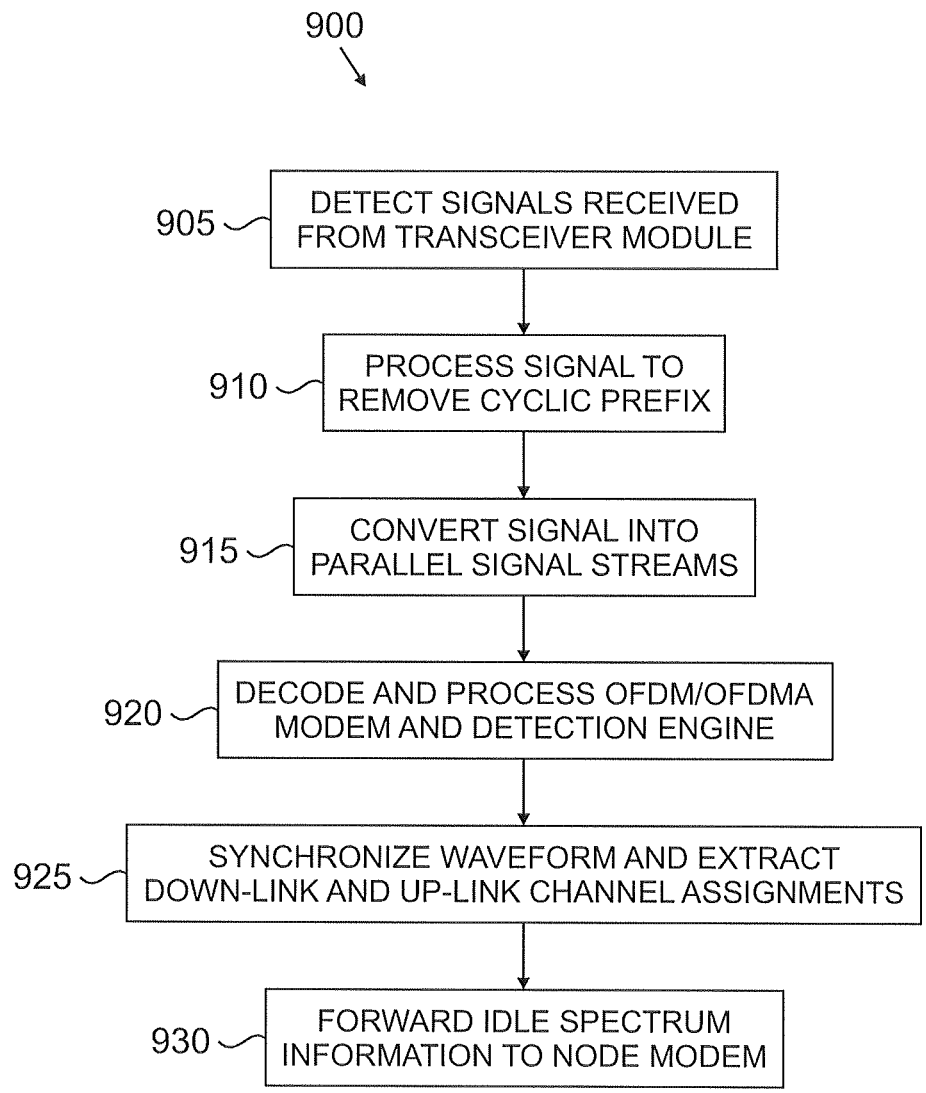
FIG. 9 is a somewhat simplified a flow diagram illustrating a method of synchronous spectrum sharing according to one embodiment of the present disclosure.

FIG. 9 is a somewhat simplified flow diagram of method 900 for synchronous spectrum sharing based on OFDM/OFDMA signaling according to one embodiment of the present disclosure. In step 905, an OFDM/OFDMA frame detector, such as OFDM/OFDMA frame detector 402, detects signals received from a transceiver module, such as transceiver module 404. In step 910, the signal is passed to a CP remove block, such as CP remove block 406, where the CP is removed from the signal.

In step 915, the signal is then passed to a serial-to-parallel block, such as serial-to-parallel block 408. Serial-to-parallel block 408 separates the data signal into parallel data streams (e.g., $X_0 \ldots X_{N-1}$). A MAP within serial-to-parallel converter 408 maps each parallel data stream into I and Q modulation symbols, which are applied to FFT block, such as FFT block 410. In step 920, the data streams are passed to parallel-to-serial and decoder block, such as parallel-to-serial and decoder block 412, and then output to an OFDM/OFDMA modem and detection engine, such as OFDM/OFDMA modem and detection engine 414.

In step 925, an OFDM/OFDMA frame detector, such as OFDM/OFDMA frame detector 402 in a node modem, such as node modem 416, detects the broadcast OFDM waveform. OFDM/OFDMA frame detector 402 synchronizes the waveform to the OFDM frame and extracts the down-link and up-link channel assignments for that frame with OFDM modem and detection engine 414. In step 930, OFDM/OFDMA modem and detection engine 414 then outputs the signal to node modem 416 and forwards idle spectrum information to node modem 416. Accordingly, method 900 provides secondary users have dynamic access to channel availability (e.g., "white space") in broadcast wireless waveforms such as, for example, in IEEE-802.16 or WiMAX, on a non-interfering or leasing basis. Using system 400 secondary users refer to spectrum users who are not owners of the spectrum but who operate in the spectrum based on agreements/etiquettes imposed by the primary users or regulatory entities. For example, using method 900, secondary users of system 400 dynamically form ad-hoc mesh network communications in fixed or mobile scenarios. In other words, secondary users refer to spectrum users who are not owners of the spectrum but who operate in the spectrum based on agreements/etiquettes imposed by the primary users or regulatory entities. For example, secondary users of method 400 may dynamically form ad-hoc mesh network communications in fixed or mobile scenarios.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A synchronous spectrum sharing system for using in a wireless communication system having a primary user node and a secondary user node, the system comprising:
   a frame detector configured to detect a frame of a broadcast waveform and extract idle spectrum information for the frame to the secondary user node,
   wherein the secondary user node is configured to transmit data in at least two unused symbol slots identified in the idle spectrum information.

2. The system set forth in claim 1, wherein the frame detector is one of: an OFDM frame detector and an OFDMA frame detector.

3. The system set forth in claim 1, wherein the broadcast waveform is one of: an OFDM waveform and an OFDMA waveform.

4. The system set forth in claim 1, wherein the secondary use node comprises a node modem.

5. The system set forth in claim 4, wherein the node modem is a MANET node modem.

6. The system set forth in claim 4, wherein the node modem and the frame detector are synchronized.

7. The system set forth in claim 1, wherein the secondary user node extracts a down-link channel assignment and an up-link channel assignment for the frame.

8. The system set forth in claim 1, wherein a second secondary user node transmits data in a second unused symbol slot identified in the idle spectrum information.

9. For use in a wireless communication network having a primary user node and a secondary user node, a method of synchronous spectrum sharing, the method comprising:
   detecting a frame of a broadcast waveform;
   extracting idle spectrum information for the frame to the secondary user node;
   and transmitting data from the secondary user node in at least two unused symbol slots identified in the idle spectrum information.

10. The method set forth in claim 9, wherein the detecting the frame is accomplished by one of: an OFDM frame detector and an OFDMA frame detector.

11. The method set forth in claim 9, wherein the broadcast waveform is one of: an OFDM waveform and an OFDMA waveform.

12. The method set forth in claim 9, wherein the secondary use node comprises a node modem.

13. The method set forth in claim 12, wherein the node modem is a MANET node modem.

14. The method set forth in claim 12 further comprising: synchronizing the node modem and the frame detector.

15. The method set forth in claim 9 further comprising: extracting a down-link channel assignment and an up-link channel assignment for the frame.

16. The method set forth in claim 9 further comprising: transmitting data from a second secondary user node into a second unused symbol slot identified in the idle spectrum information.

17. For use in an OFDM/OFDMA wireless communication system, an apparatus for synchronous spectrum sharing, the apparatus comprising:

a secondary user node having a node modem;

and a frame detector configured to detect a frame of a broadcast waveform and extract idle spectrum information for the frame to the secondary user node, wherein the secondary user node is configured to transmit data in at least two unused symbol slots identified in the idle spectrum information.

18. The apparatus set forth in claim 17, wherein the node modem is a MANET node modem.

19. The apparatus set forth in claim 17, wherein the node modem and the frame detector are synchronized.

20. The apparatus set forth in claim 17, wherein the secondary user node extracts a down-link channel assignment and an up-link channel assignment for the frame.

21. The apparatus set forth in claim 17, wherein a second secondary user node transmits data in a second unused symbol slot identified in the idle spectrum information.

* * * * *